Patented June 18, 1940

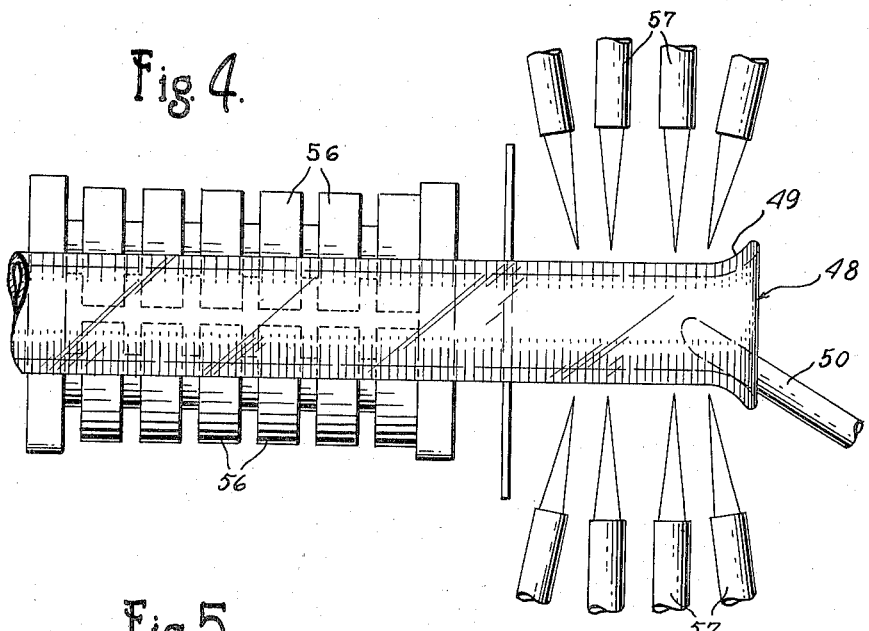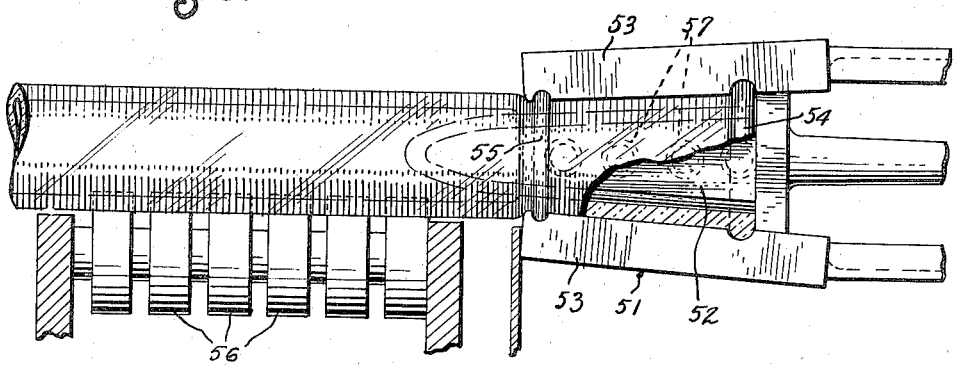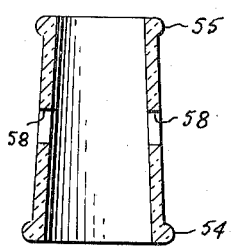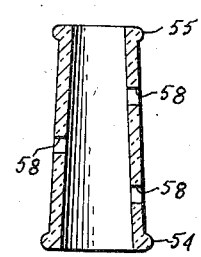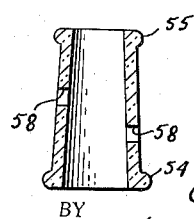

2,204,542

UNITED STATES PATENT OFFICE 2,204,542

APPARATUS FOR FORMING STOPCOCK BARRELS

Charles G. Anastor, Vineland, N. J., assignor to Kimble Glass Company, Vineland, N. J., a corporation of Illinois Application August 28, 1937, Serial No. 161,521

1 Claim. (Cl. 49—28)

The present invention relates to the fabrication of glass stopcock barrels and more particularly to a method and apparatus for accurately shaping and holing the barrels.

It has been the practice in making tapered stopcock barrels formed from glass tubing to shape a section of tubing, that is, tooling the section to form the proper taper for the barrel, at the same time providing reinforcing rings at the ends of the barrel, and then heating the thus formed barrel at those points at which it is desired to provide apertures in the walls thereof, after which a pronged spring tool is inserted in the barrel and expanded to force the prongs through the heated plastic portions of the barrels. Usually projections are formed on the exterior of the barrel which subsequently have to be cut off. The holes are then reamed.

The foregoing process has several disadvantages chief of which is the dependence on the workman properly to gauge the positions of the apertures and the fact that the openings are made by hand tools, requiring considerable experience and deft handling of the tool by the operator.

It is one of the objects of the present invention to simplify the method of making stopcock barrels of the type referred to herein.

It is another object of the invention to provide easily operated mechanism for forming the apertures in stopcock barrels, this mechanism including means which accurately position the barrel with respect to the holing tools so that the apertures are definitely located.

It is a further object of the invention to provide holing tools or punches which eliminate the necessity for cutting off projections and further reaming the openings formed thereby.

Other objects will be apparent from the following description taken in connection with the accompanying drawings, in which.

Figure 1:
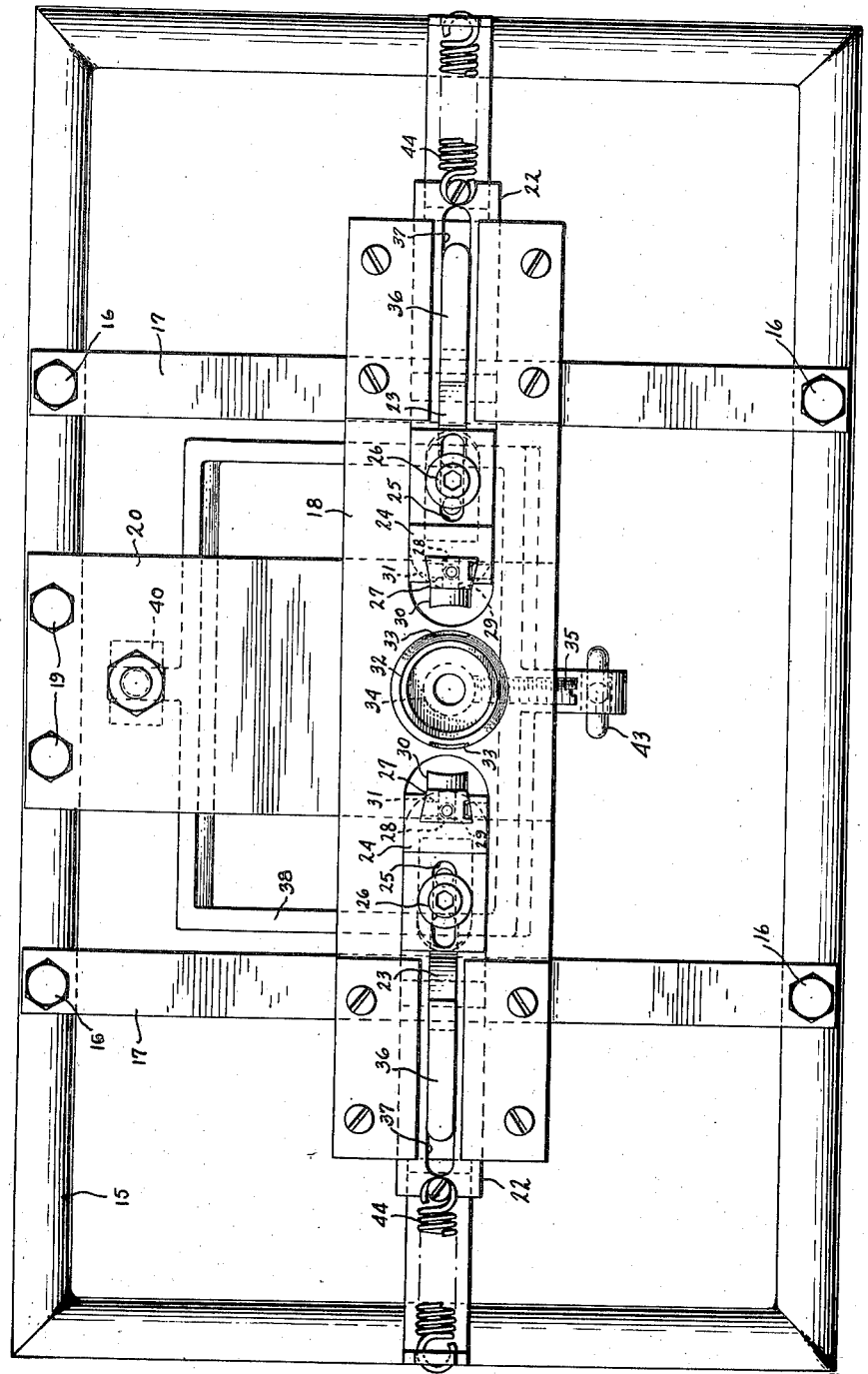
Fig. 1 is a top plan view of the machine for punching apertures in the barrel.
Figure 2:
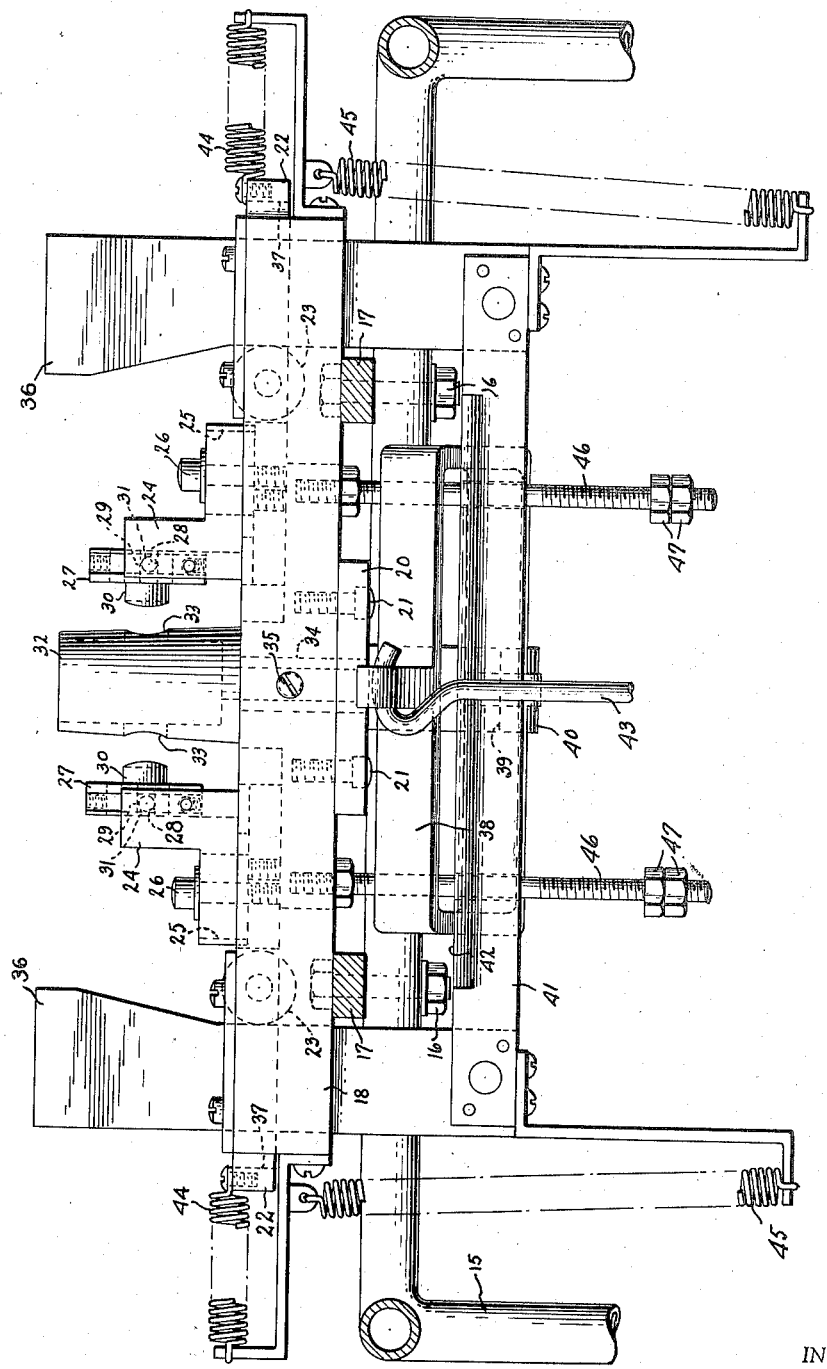
Fig. 2 is a front elevation, partly in section and certain parts being broken away, of the machine shown in Fig. 1.
Figure 3:
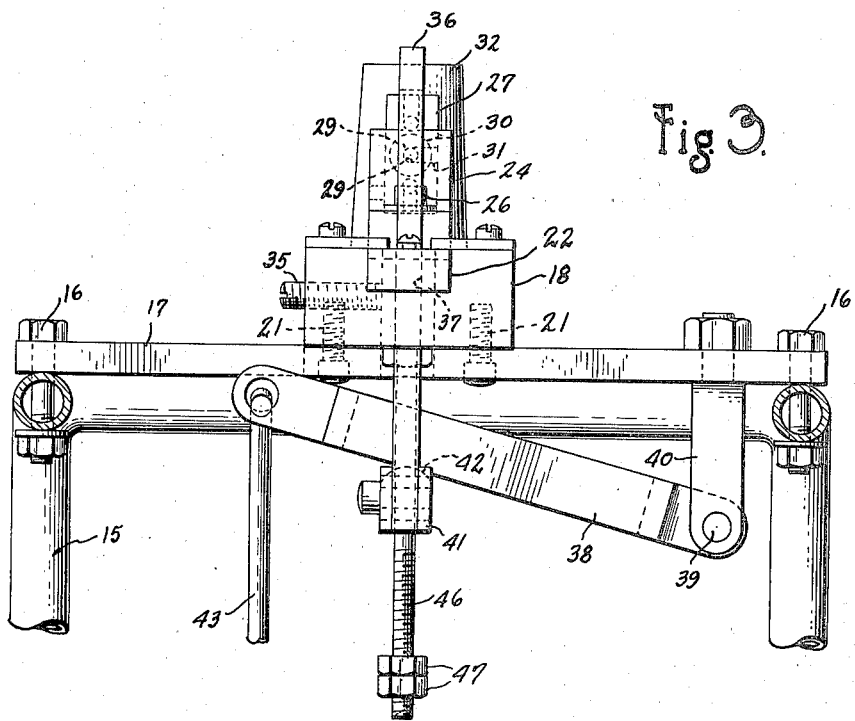
Fig. 3 is a side view, partly in section and partly broken away, of the machine.
Figure 6:
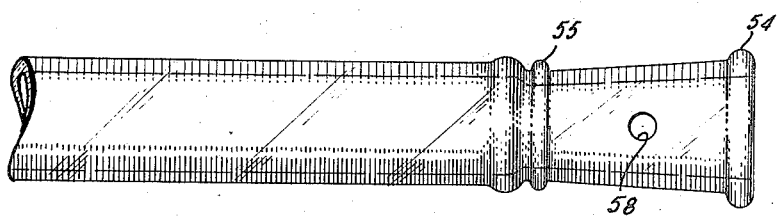
Figure 7:
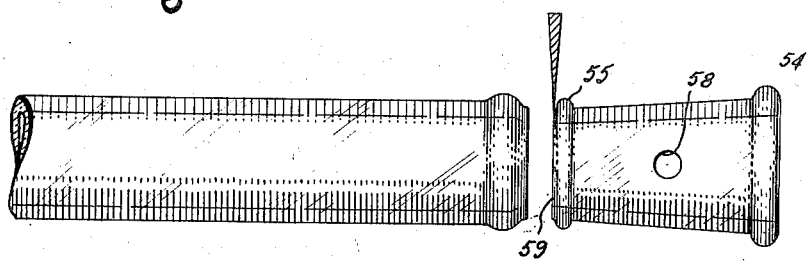

Figs. 4, 5, 6, and 7 illustrate certain steps of the method of fabricating the barrel; and Figs. 8, 9, and 10 show several forms of barrels which the machine is capable of making.

Referring to the drawings, it will be seen that the machine is supported on a frame 15 having secured thereto by means of bolts 16 cross pieces 17, the latter supporting bed 18. Also secured to the frame by means of bolts 19 is a plate 20 to which the bed is held by screws 21. Mounted for horizontal reciprocation in the bed is a pair of aligned oppositely movable carriages 22, each carrying a roller or cam follower 23 thereon. Each carriage also carries a tool supporting bracket 24, the latter being provided with a slot 25 to accommodate screw 26 whereby the bracket is adjustably fixed to its carriage.

Adjustably mounted in and held to each of the brackets 24 is a punch holder or slide 27 having an aperture 28 accommodating stud 29 on the tool or punch 30. Punches 30 are held in the slides 27 by set screws 31 so that the punches are vertically adjustable with respect to the supporting brackets. Supported on the bed between the slides is a hollow die or mandrel 32, the same being tapered and having apertures 33 in its wall. A post 34 on the mandrel is engaged by set screw 35 to hold the mandrel to the bed. These apertures are shown as being opposite and aligned, but may be out of alignment depending on the type of barrel desired.

It is intended, of course, that several sizes of mandrels be provided, that they be interchangeable, and that the die apertures 33 be so located that the desired type of barrel be produced. It is also intended that the punches be interchangeable and that several sizes thereof be provided. It will be apparent from the drawings that accurate alignment of the punches with the die apertures is insured by proper setting of the punches with respect to the openings in the mandrel and, as a result, uniformly holed barrels are obtained.

The mechanism for advancing the punches to hole the barrels comprises a pair of cams 36 slidable vertically in slot 37 in each carriage and cooperating with rollers 23, and lever 38 pivoted at 39 to the furcated bracket 40 secured to plate 20. The cams are each secured to connecting bar or bars 41 the upper edge of which is rounded as indicated at 42. Lever 38 engages this rounded edge.

A suitable foot lever (not shown) is connected to lever 38 through link 43 and, when the foot lever is depressed, both cams will be simultaneously lowered, thereby moving the slides and tools toward and into cooperation with the mandrel. Springs 44, 45 return the carriages and cams, respectively, to their normal or retracted positions. To prevent too great a depression of bar 41 and possibly injury to the barrel being punched, a pair of depending rods 46 having limiting stops in the form of nuts 47 threaded thereon are secured to the bed of the machine. The stop members are adjustable as to height and limit the degree to which the cams may be lowered by the operator.

In Figs. 4, 5, 6, and 7 are shown the essential steps to be followed in forming the stopcock barrel. In Fig. 4 it will be seen that the end of a glass tube 48, properly heated, is flared as at 49 by a suitable tool 50. A taper and ring tool 51, which is shown in Fig. 5 as a hand tool but which may be machine operated, is then brought into engagement with the flared end of the heated plastic tube end, the mandrel 52 of the tool forming the internal tapered surface and the formers 53 shaping the external surface to produce the combined taper and reinforcing rings 54, 55. While the tube is being thus shaped it is supported on rollers 56 and subjected to the flames from burners 57, at the same time being rotated to heat the end portion of the tube on all sides. While still hot and plastic the shaped end of the tube is placed over the mandrel 32 on the machine, after which the cams are lowered to move the punches towards the mandrel and into apertures 33 in the wall thereof. Thus apertures 58 are punched in the sides of the barrel from the outer surface of the tapered portion through the inner surface thereof, the resulting product being shown in Fig. 6.

If desired, the barrel may again be shaped by tool 51 after the punching operation. A cold knife or scoring tool is then applied to the tube adjacent to reinforcing ring 55 to permit the barrel to be broken or cracked away from the remainder of the tube along the line 59 indicated in Fig. 7, the rough edge then being smoothed by grinding or a fire finish. The barrel is then fitted to the stopcock by lapping the male in the tapered bore of the barrel.

In the example illustrated in Fig. 8, the apertures in the barrel are shown as being opposite each other and in axial alignment. Some types of barrels are provided with apertures oppositely disposed but not in axial alignment, as shown in Figs. 9 and 10. It is obvious that, since the punches and mandrels are interchangeable, suitable punches, either single or multiple, may be placed in the brackets and aligned with correspondingly disposed apertures in the mandrel to produce any of the barrels illustrated.

While a preferred embodiment of the machine has been shown and the sequence of steps described is that preferred, it is not intended that the invention be limited to the exact details disclosed but that it be susceptible of modification within the terms of the appended claim.

What is claimed is:

Apparatus for forming stopcock barrels from glass tubing comprising a frame, a tapered mandrel on said frame adapted to support a similarly tapered tubular glass blank, said mandrel being hollow and having diametrically opposite apertures in its wall, a pair of carriages slidably reciprocable on said frame, a plurality of punches, at least one on each of said carriages, said punches being movable into said apertures to form openings in the wall of the blank, means for reciprocating said carriages and the punches supported thereon, and selectively positioned stop means engageable with said carriage reciprocating means for limiting reciprocation of said punches, said stop means including members depending from said frame and stop elements adjustably positioned on said depending members.

CHARLES G. ANASTOR.